US010681005B2

(12) United States Patent
Constantinescu et al.

(10) Patent No.: US 10,681,005 B2
(45) Date of Patent: Jun. 9, 2020

(54) DEPLOYING A NETWORKING TEST TOOL IN A CLOUD COMPUTING SYSTEM

(71) Applicant: Keysight Technologies Singapore (Sales) Pte. Ltd., Singapore (SG)

(72) Inventors: Mihail Florin Constantinescu, Bucharest (RO); Taran Singh, Woodland Hills, CA (US)

(73) Assignee: KEYSIGHT TECHNOLOGIES SINGAPORE (SALES) PTE. LTD., Singapore (SG)

( * ) Notice: Subject to any disclaimer, the term of this patent is extended or adjusted under 35 U.S.C. 154(b) by 158 days.

(21) Appl. No.: 15/374,675

(22) Filed: Dec. 9, 2016

(65) Prior Publication Data

US 2018/0167285 A1 Jun. 14, 2018

(30) Foreign Application Priority Data

Dec. 8, 2016 (RO) ................ a 2016 00988

(51) Int. Cl.
*H04L 12/24* (2006.01)
*H04L 29/06* (2006.01)
(Continued)

(52) U.S. Cl.
CPC .......... *H04L 63/0227* (2013.01); *H04L 43/50* (2013.01); *H04L 67/34* (2013.01);
(Continued)

(58) Field of Classification Search
CPC ..... H04L 63/0227; H04L 43/50; H04L 67/34; H04L 41/0886; H04L 63/029; H04L 63/1433; H04L 67/10
(Continued)

(56) References Cited

U.S. PATENT DOCUMENTS 6,381,218 B1 4/2002 McIntyre et al.
7,340,771 B2 3/2008 Chan et al.
(Continued)

FOREIGN PATENT DOCUMENTS

WO   WO 03/069493 A1    8/2003
WO   WO 2016/130280 A1  8/2016
WO   WO 2018/106304     6/2018

OTHER PUBLICATIONS

Notice of Allowance and Fee(s) Due for U.S. Appl. No. 14/619,041 (dated May 9, 2017).
(Continued)

*Primary Examiner* — Moustafa M Meky
*Assistant Examiner* — Elizabeth Kassa (57) ABSTRACT

Methods, systems, and computer readable media for deploying a networking test tool in a cloud computing system are disclosed. An example method includes receiving user input specifying configuration information for a networking test tool for deployment in a cloud computing system. The user input specifies a range of networking test ports. The method includes deploying a central test server in the cloud computing system and deploying one or more public test agents in the cloud computing system. The method includes configuring the central test server, the one or more public test agents, and one or more private test agents in a network outside the cloud computing system to exchange test traffic using the range of networking test ports specified by the user input. The method includes configuring a firewall for the cloud computing system to open the range of networking test ports in the firewall for the test traffic.

17 Claims, 5 Drawing Sheets

(51) Int. Cl.
*H04L 29/08* (2006.01)
*H04L 12/26* (2006.01)

(52) U.S. Cl.
CPC ........ *H04L 41/0886* (2013.01); *H04L 63/029* (2013.01); *H04L 63/1433* (2013.01); *H04L 67/10* (2013.01)

(58) Field of Classification Search
USPC ....................................................... 709/224
See application file for complete search history.

(56) References Cited

U.S. PATENT DOCUMENTS

| | | | |
|---|---|---|---|
| 7,594,259 | B1 | 9/2009 | Audet et al. |
| 8,065,418 | B1 | 11/2011 | Abuan et al. |
| 9,052,941 | B1 | 6/2015 | Bone |
| 9,608,906 | B2 | 3/2017 | Constantinescu et al. |
| 9,680,877 | B2 | 6/2017 | Duffield et al. |
| 9,769,291 | B2 | 9/2017 | Nistor et al. |
| 9,814,008 | B2 | 11/2017 | Nistor |
| 10,097,442 | B2 | 10/2018 | Nistor et al. |
| 10,110,556 | B2 | 10/2018 | Nistor |
| 2002/0124189 | A1 | 9/2002 | Bakke |
| 2004/0125801 | A1 | 7/2004 | Nawata |
| 2004/0139227 | A1 | 7/2004 | Takeda |
| 2004/0240468 | A1 | 12/2004 | Chin et al. |
| 2004/0255156 | A1 | 12/2004 | Chan et al. |
| 2005/0076235 | A1* | 4/2005 | Ormazabal ............ H04L 63/02 726/4 |
| 2005/0226194 | A1 | 10/2005 | Fan et al. |
| 2006/0062203 | A1 | 3/2006 | Satapati |
| 2007/0044156 | A1* | 2/2007 | Redmann ............ H04L 41/0869 726/25 |
| 2007/0083788 | A1* | 4/2007 | Johnson ............... H04L 43/50 714/1 |
| 2007/0213966 | A1 | 9/2007 | Noble |
| 2007/0283002 | A1 | 12/2007 | Bornhoevd et al. |
| 2008/0072312 | A1 | 3/2008 | Takeyoshi et al. |
| 2008/0317020 | A1 | 12/2008 | Horne |
| 2009/0040942 | A1 | 2/2009 | Yang |
| 2009/0077245 | A1 | 3/2009 | Smelyansky et al. |
| 2009/0154363 | A1 | 6/2009 | Stephens |
| 2010/0183151 | A1 | 7/2010 | Wing et al. |
| 2010/0198960 | A1* | 8/2010 | Kirschnick ......... G06F 11/3414 709/224 |
| 2011/0010413 | A1 | 1/2011 | Christenson et al. |
| 2011/0187864 | A1 | 8/2011 | Snider |
| 2011/0289440 | A1 | 11/2011 | Carter et al. |
| 2012/0054491 | A1 | 3/2012 | Tippett |
| 2012/0075439 | A1 | 3/2012 | Gong et al. |
| 2012/0078547 | A1 | 3/2012 | Murdoch |
| 2012/0311693 | A1 | 12/2012 | Horman et al. |
| 2013/0173962 | A1 | 7/2013 | Li et al. |
| 2013/0272322 | A1 | 10/2013 | Sagarwala et al. |
| 2013/0343388 | A1* | 12/2013 | Stroud .................... H04L 47/00 370/392 |
| 2014/0119203 | A1 | 5/2014 | Sundaram et al. |
| 2014/0280901 | A1 | 9/2014 | Blachandran et al. |
| 2014/0310397 | A1 | 10/2014 | Tseng et al. |
| 2015/0082417 | A1 | 3/2015 | Bhagwat et al. |
| 2015/0113588 | A1 | 4/2015 | Wing et al. |
| 2015/0242294 | A1* | 8/2015 | Lapierre ............... G06F 11/079 714/37 |
| 2016/0014011 | A1* | 1/2016 | Liu ........................ H04L 43/50 709/225 |
| 2016/0156541 | A1 | 6/2016 | Nistor et al. |
| 2016/0173444 | A1 | 6/2016 | Nistor |
| 2016/0174178 | A1 | 6/2016 | Nistor |
| 2016/0234113 | A1 | 8/2016 | Constantinescu et al. |
| 2016/0234163 | A1 | 8/2016 | Nistor et al. |
| 2016/0248795 | A1 | 8/2016 | Chien |
| 2017/0097841 | A1* | 4/2017 | Chang ................. G06F 9/45558 |
| 2018/0124150 | A1* | 5/2018 | Myron ................. H04L 67/025 |
| 2018/0338346 | A1 | 11/2018 | Routt |
| 2019/0036963 | A1 | 1/2019 | Ahad et al. |
| 2019/0182213 | A1 | 6/2019 | Saavedra et al. |
| 2019/0297057 | A1 | 9/2019 | Raney et al. |

OTHER PUBLICATIONS

Non-Final Office Action for U.S. Appl. No. 14/572,746 (dated Mar. 7, 2017).

Non-Final Office Action for U.S. Appl. No. 14/574,359 (dated Jan. 17, 2017).

Non-Final Office Action for U.S. Appl. No. 14/619,041 (dated Dec. 16, 2016).

Notice of Allowance and Fee(s) Due for U.S. Appl. No. 14/619,039 (dated Nov. 7, 2016)

Non-Final Office Action for U.S. Appl. No. 14/572,746 (dated Aug. 24, 2016).

Non-Final Office Action for U.S. Appl. No. 14/619,039 (dated Jul. 13, 2016).

Notification of Transmittal of the International Search Report and the Written Opinion of the International Searching Authority, or the Declaration for International Application No. PCT/US2016/013827 (dated May 2, 2016).

Commonly-assigned, co-pending U.S. Appl. No. 14/619,039 for "Methods, Systems, and Computer Readable Media for Identifying Network Locations Associated with Endpoints," (Unpublished, filed Feb. 10, 2015).

Commonly-assigned, co-pending U.S. Appl. No. 14/619,041 for "Methods, Systems, and Computer Readable Media for Facilitating the Resolving of Endpoint Hostnames in Test Environments with Firewalls, Network Address Translators (NATs), or Clouds," (Unpublished, filed Feb. 10, 2015).

Commonly-assigned, co-pending U.S. Appl. No. 14/574,359 for "Methods, Systems, and Computer Readable Media for Initiating and Executing Performance Tests of a Private Network and/or Components Thereof," (Unpublished, filed Dec. 17, 2014).

Commonly-assigned, co-pending U.S. Appl. No. 14/572,746 for "Methods, Systems, and Computer Readable Media for Receiving a Clock Synchronization Message," (Unpublished, filed Dec. 16, 2014).

Commonly-assigned, co-pending U.S. Appl. No. 14/557,418 for "Methods, Systems, and Computer Readable Media for Receiving Test Configuration Information," (Unpublished, filed Dec. 1, 2014).

"UDP hole punching," Wikipedia, http://en.wikipedia.org/wiki/UDP_hole_punching, (Nov. 25, 2014).

Marius Pavel Nistor, "Application Mixes Add New Levels of Realism to IxChariot 8 Network Testing," Ixia, (Aug. 1, 2014).

Commonly-assigned, Co-pending U.S. Appl. No. 15/934,957 for "Dynamic Firewall Configuration and Control for Accessing Services Hosted in Virtual Networks," (Unpublished, filed Mar. 24, 2018)

Notification of Transmittal of the International Search Report and the Written Opinion of the International Searching Authority, or the Declaration for International Application No. PCT/US2017/051357 (dated Dec. 15, 2017).

Extended European Search Report for European Application No. 16749568.8 (dated Jun. 8, 2018)

Vixie et al., "Dynamic Updates in the Domain Name System (DNS Update)," RFC 2136, pp. 1-26 (Apr. 1997).

Non-Final Office Action for U.S. Appl. No. 14/574,359 (dated Nov. 16, 2017).

Advisory Action and AFCP 2.0 Decision for U.S. Appl. No. 14/574,359 (dated Oct. 16, 2017).

Supplemental Notice of Allowability for U.S. Appl. No. 14/572,746 (dated Oct. 5, 2017).

Non-Final Office Action for U.S. Appl. No. 14/557,418 (dated Sep. 27, 2017).

Final Office Action for U.S. Appl. No. 14/557,418 (dated May 3, 2018).

Communication of European publication number and information on the application of Article 67(3) EPC for European Patent Application No. 16749568.8 (dated Aug. 23, 2017).

(56) References Cited

OTHER PUBLICATIONS

Final Office Action for U.S. Appl. No. 14/574,359 (dated Jul. 27, 2017).
Notice of Allowance and Fee(s) Due for U.S. Appl. No. 14/572,746 (dated Jul. 11, 2017).
Applicant Initiated Interview Summary for U.S. Appl. No. 14/572,746 (dated Jun. 22, 2017).
Notice of Allowance and Fee(s) Due and Examiner-Initiated Interview Summary for U.S. Appl. No. 14/574,359 (dated Jun. 13, 2018).
"NAT Port Mapping Protocol," Wikipedia, https://en.wikipedia.org/wiki/NAT_Port_Mapping_Protocol, pp. 1-2 (Accessed Mar. 22, 2018).
Corrected Notice of Allowability for U.S. Appl. No. 14/557,418 (dated Aug. 8, 2018).
Notice of Allowance and Fee(s) Due, Examiner-Initiated Interview Summary, and AFCP 2.0 Decision for U.S. Appl. No. 14/557,418 (dated Jul. 24, 2018).
Office Action for Great Britain Patent Application Serial No. 1903696.1 (dated Sep. 18, 2019).
Non-Final Office Action for U.S. Appl. No. 15/934,957 (dated Feb. 20, 2020).
Communication under Rule 71(3) EPC Intention to Grant for European Patent Application Serial No. 16 749 568.8 (dated Feb. 20, 2020).

* cited by examiner

Central Server Configuration

Instance Type [ ▾ ]  ← 252

Test Agent Configuration

Number of Instances [ 3 ]  ← 254

Instance Type [ ▾ ]  ← 256

Test Traffic Ports [ 5000,5100 ]  ← 258

DEPLOYING A NETWORKING TEST TOOL IN A CLOUD COMPUTING SYSTEM

PRIORITY CLAIM

This application claims the benefit of Romanian Patent Application No. a 2016 00988, filed Dec. 8, 2016; the disclosure of which is incorporated herein by reference in its entirety.

TECHNICAL FIELD

The subject matter described in this specification relates generally to test configuration for data communication networks and more particularly to methods, systems, and computer readable media for deploying a networking test tool in a cloud computing system.

BACKGROUND

Network operators typically test network nodes for reliability and other characteristics before deploying the network nodes in live (e.g., non-test) and/or private networks. While testing a network node before deployment may be beneficial, scenarios exist where testing a network node in a live and/or private network is useful and/or necessary, e.g., for detecting and/or resolving previously undetected issues. However, issues can arise when attempting to configure network nodes for testing in a live and/or private network. In particular, configuring network nodes for testing in a live and/or private network may create or exacerbate security concerns since a test operator may need to traverse firewall and/or network address translation (NAT) devices to communicate with the network nodes.

Conventional solutions, such as secure shell (SSH) or hypertext transfer protocol (HTTP) tunneling, allow test configuration information to traverse firewall devices and NAT devices. However, these solutions are not completely secure because they require the test operator to open ports in the firewall devices (e.g., port '80' for HTTP and port '22' for SSH tunnels). These solutions also require significant product support work because each route which the test configuration information will traverse needs a tunnel. Moreover, HTTP encapsulation is also not preferred because although the operator may allow port '80' to be opened in the firewall devices, content-aware devices can block the traffic. Furthermore, manual setup of public IP endpoints is typically be needed for NAT traversal. Hence, a significant amount of work is generally required for configuring network nodes for testing in a live and/or private network.

Accordingly, a need exists for improved methods, systems, and computer readable media for receiving test configuration information.

SUMMARY

Methods, systems, and computer readable media for deploying a networking test tool in a cloud computing system are disclosed. An example method includes receiving user input specifying configuration information for a networking test tool for deployment in a cloud computing system. The user input specifies a range of networking test ports. The method includes deploying a central test server in the cloud computing system and deploying one or more public test agents in the cloud computing system. The method includes configuring the central test server, the one or more public test agents, and one or more private test agents in a network outside the cloud computing system to exchange test traffic using the range of networking test ports specified by the user input. The method includes configuring a firewall for the cloud computing system to open the range of networking test ports in the firewall for the test traffic.

The features described in this specification may be implemented using any appropriate combination of computing components, for example, hardware, software, and firmware. The terms "function" "node" or "module" refer to hardware, which may also include software and/or firmware components, for implementing the feature being described. In some examples, the features described in this specification may be implemented using a computer readable medium storing computer executable instructions that when executed by at least one processor of a computer control the computer to perform operations. Examples of appropriate computer readable media include non-transitory computer-readable media, such as disk memory devices, chip memory devices, programmable logic devices, and application specific integrated circuits. A computer readable medium may be located on a single device or computing platform or may be distributed across multiple devices or computing platforms.

DETAILED DESCRIPTION

Figure 1:
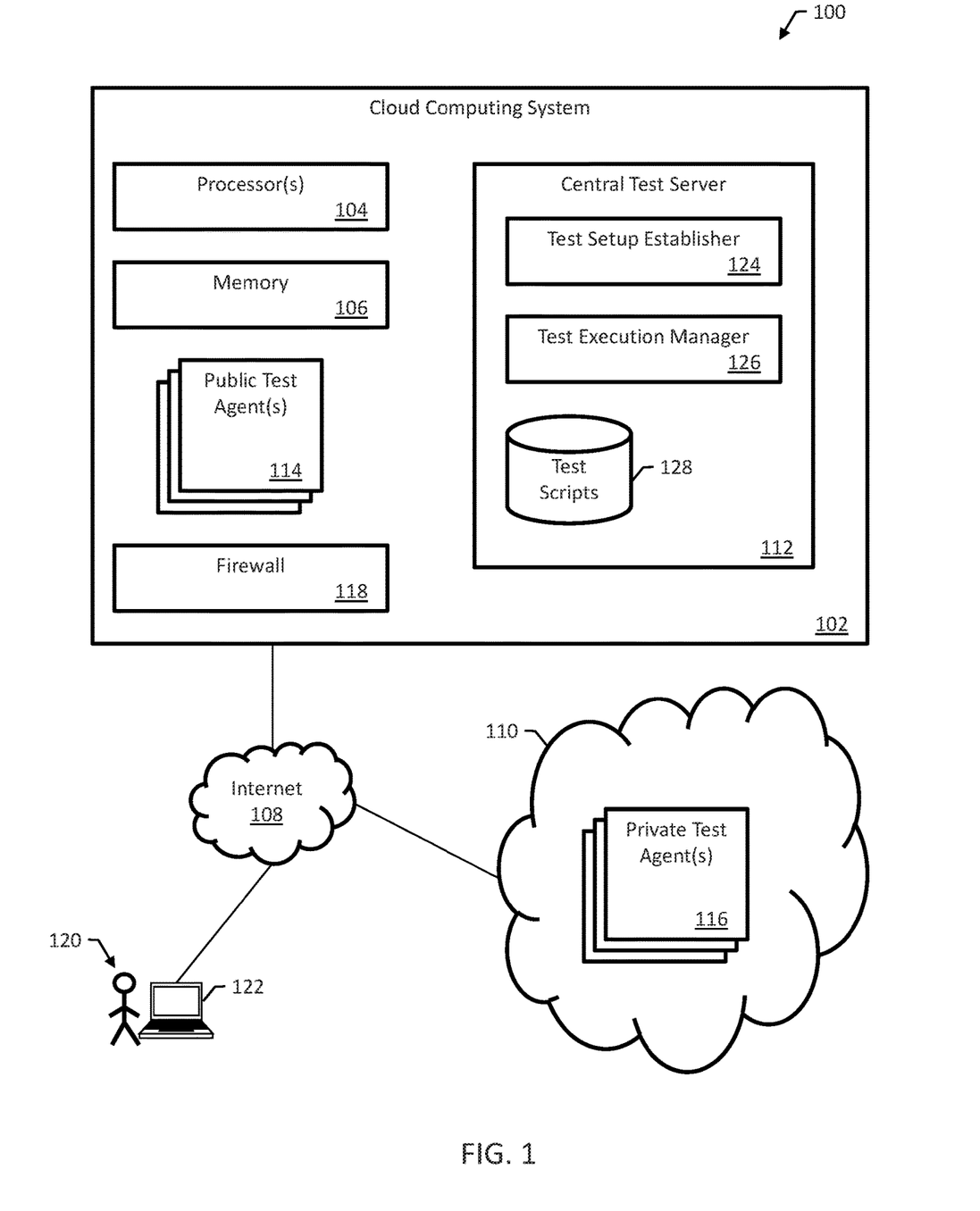
FIG. 1 is a block diagram of an example network environment for deploying a networking test tool in a cloud computing system.

FIG. 1 is a block diagram of an example network environment 100 for deploying a networking test tool in a cloud computing system 102. Cloud computing system 102 is implemented as a distributed computing system comprising processors 104 and memory 106 storing executable instructions for processors 104. In operation, cloud computing system 102 hosts various applications that execute on one or more of processors 104 and interact with remote user devices over a data communications network, e.g., the Internet 108. For example, cloud computing system 102 can be implemented as a virtual machine host or a multi-tenant computing system.

Network environment 100 implements a networking test tool as a central server 112 hosted on cloud computing system 102, one or more public test agents 114 hosted on cloud computing system 102, and one or more private test agents 116 hosted in a private network 110, e.g., executing on a different distributed computing system within private network 110. For example, private network 110 can be an enterprise network.

In some examples, connections may only be opened or initiated by nodes inside private network 110 since security related devices (e.g., firewalls or network address translation (NAT) devices) may not allow inbound connections on ports, e.g., other than test ports. In those examples, private test agents 116 receive test configuration information from central test server 112 via outbound connections or using a proxy node or intermediate node.

The networking test tool is configured to test and verify one or more of various communications performance indicators for communications between at least public test agents 114 and private test agents 116. To protect the public test agents 114 and possibly other applications hosted on cloud computing system 102, cloud computing system 102 includes a firewall 118.

Firewall 118 can be implemented as any appropriate combination hardware and software for selectively blocking instrusive incoming communications. For example, firewall 118 can be configured for blocking incoming communications based on internet protcol (IP) addresses or Transmission Control Procotol (TCP)/User Datagram Protocol (UDP) ports or both. In some examples, firewall 118 is a stateful firewall configured to monitor underlying connections through firewall 118, e.g., to detect communications between certain applications and apply application-specific security policies.

A test administrator 120 can deploy the networking test tool using a user computer device 122 in communication with cloud computing system 102. User computer device 122 can be any appropriate computing system having a user input device, display, processors, and memory, e.g., user computer device 122 can be a laptop or desktop computer or a phone or tablet computer.

In operation, test administrator 120 can execute a web browser on user computer device 122 and navigate to a web site hosted by cloud computing system 102 for deploying applications on cloud computing system 102. Test administrator 120 uses a graphical user interface (GUI) supplied by cloud computing system 102 and displayed on user computer device 122 to deploy central test server 112 and public test agents 114. The private test agents 116 are deployed in private network 110, e.g., by a network administrator of private network 110.

Central test server 112, when deployed, includes a test setup establisher 124, a test execution manager 126, and one or more stored test scripts 128. Test setup establisher 124 is configured for discovering aspects of the networking test tool, e.g., for discovering the number of test agents and the network addresses of the test agents.

Test execution manager 126 manages execution of the test scripts 128, e.g., by sending instructions to public test agents 114 and private test agents 116 and receiving, receiving test result information from public test agents 114 and private test agents 116 (e.g., number of messages successfully received), and validating one or more network performance indicators (e.g., determining whether an error rate is below a threshold rate).

To initiate these network tests, private test agents 116 are configured to be able to initiate TCP or UDP traffic to public test agents 114. However, public test agents 114 may be protected by default by firewall 118, e.g., so that firewall 118 is blocking all incoming traffic on all ports. For this reason, firewall 118 is configured to open some TCP or UDP ports (or both) for the test traffic of the networking test tool. The same ports then are used as destination ports by private test agents 116.

Test administrator 120 can perform the ports configuration manually and post-deployment. For example, once the networking test tool is deployed with both public test agents 114 and private test agents 116, test administrator 120 can choose a range of test traffic ports and proceed with opening them manually in firewall 118 for each public test agent 114. Then, test administrator 120 or another appropriate entity manually configures those same ports as destination ports for each of private test agents 116.

These manual configuration steps, however, can be cumbersome and error-prone, and any mistake would result in failure to run the test traffic. Instead, test administrator 120 can use a network test deployer to automatically configure the appropriate ports. For example, the test traffic ports and the firewall can be configured during deployment, together, so that test administrator 120 need not perform manual configuration post-deployment. Deployment information collection and configuration of the test traffic ports can be done in a single step, i.e., during deployment.

Figure 2A:
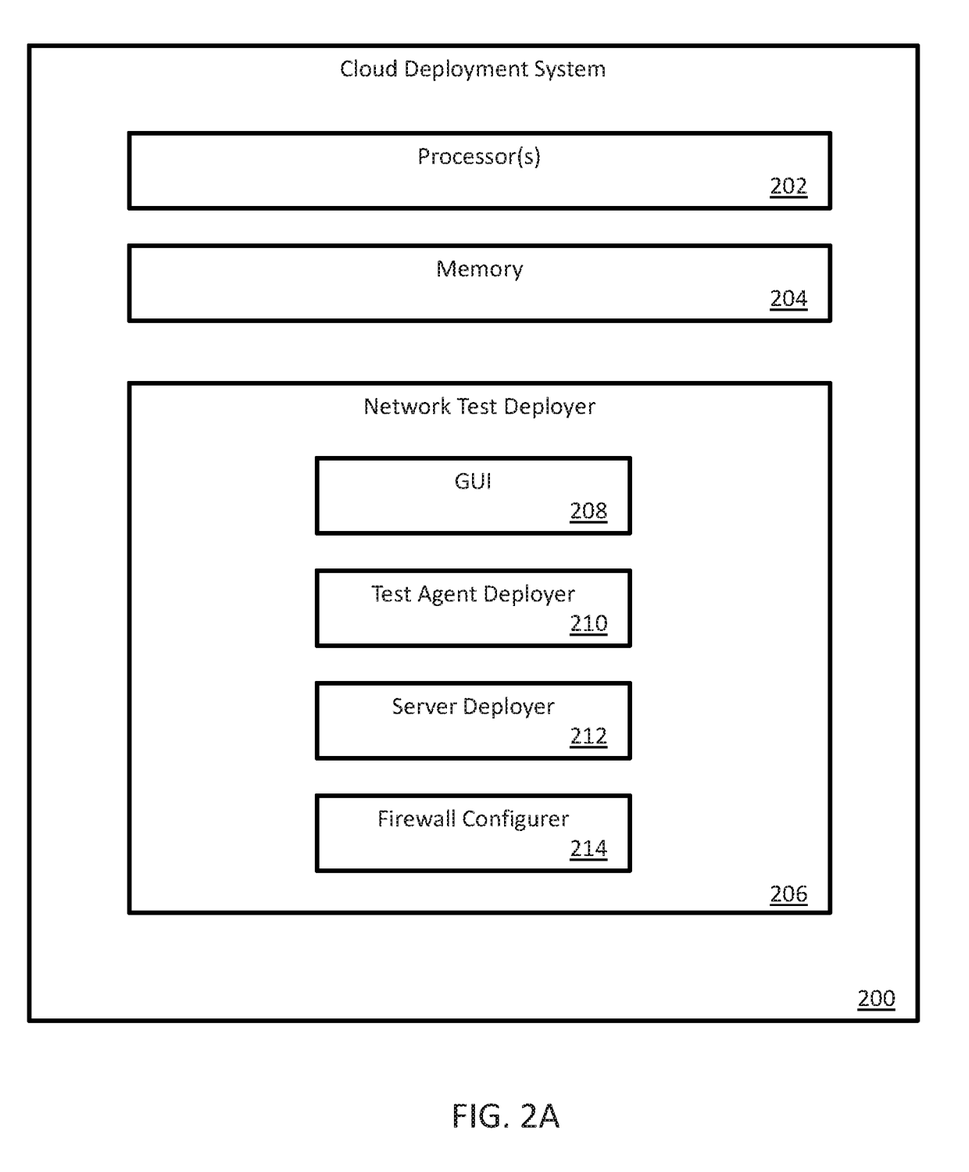
FIG. 2A is a block diagram of an example cloud deployment system.

FIG. 2A is a block diagram of an example cloud deployment system 200 that implements a network test deployer 206 to automatically configure the appropriate ports. Cloud deployment system 200 is implemented using one or more processors 202 and memory 204 storing executable instructions for the processors 202. For example, cloud deployment system 200 can be implemented as an instance executing on the cloud computing system 102 of FIG. 1 or as an application executing on the user computer device 122 of Figure.

Network test deployer 206 includes a deployment configuration GUI 208, a test agent deployer 210, a server deployer 212, and a firewall configurer 214. GUI 208 can be implemented, e.g., as a web site comprising a series of web pages.

GUI 208 is configured for prompting a user for various types of configuration information, such as resource information specifying one or more cloud computing resources (e.g., processors, memory, storage, networking components) and agent information specifying, e.g., a total number of test agents for the networking test tool. GUI 208 is also configured for prompting the user, during deployment phase and before the networking test tool is deployed, for a range of networking test ports to be used for the test traffic.

Test agent deployer 210 deploys test agents. For example, test agent deployer 210 can deploy test agents by sending commands to a cloud computing system using an application programming interface (API) of the cloud computing system to create test agent instances. Test agent deployer 210 configures test agents to use the specified range of networking test ports to exchange test traffic, e.g., test agent deployer 210 may directly configure public test agents hosted on the cloud computing system.

In general, a test agent is an instance executing on a cloud computing system, but in some examples a test agent can be a network device, a network module, a node, or a system of devices, nodes, and/or modules. For example, a test agent may be an endpoint located behind one or more security related devices, such as a firewall device or a NAT device, in a private network (e.g., a test network or an enterprise network). Test agents can each include a traffic generator and an emulator for emulating one or more network nodes.

For example, a test agent can be programmed to emulate a web server and another test agent can be programmed to emulate a user computer device. The test agents then can generate test traffic (e.g., messages and/or packets) associated with the web server and the user computer device.

In some examples, test agents store test configuration information for setting up and executing a test session. Test configuration information can include the range of networking test ports and other appropriate information such as a list of test participants and a script for generating and sending particular traffic and/or flows to the test participants.

Server deployer 212 deploys a central test server for the networking test tool, e.g., the central test server 112 of FIG. 1. During deployment, server deployer 212 configures the central test server with the specified range of networking test ports so that, after deployment, when running a networking test, the central test server will automatically communicate the range of networking test ports to any private test agents. The private test agents then use those ports as destination ports for test traffic that they send to the public test agents.

Firewall configurer 214 configures a firewall of the cloud computing system. Firewall configurer 214 opens the range of networking test ports in the firewall for each test agent. After deployment is complete, since the central server and the test agents and the firewall have all been configured with the range of networking test ports, the networking test tool is automatically configured for running the test traffic, without any need for manual post-deployment configuration. In particular, the user need only input the range of networking test ports once, during deployment, thereby reducing the chance of the networking test tool being unable to execute test scripts.

Figure 2B:
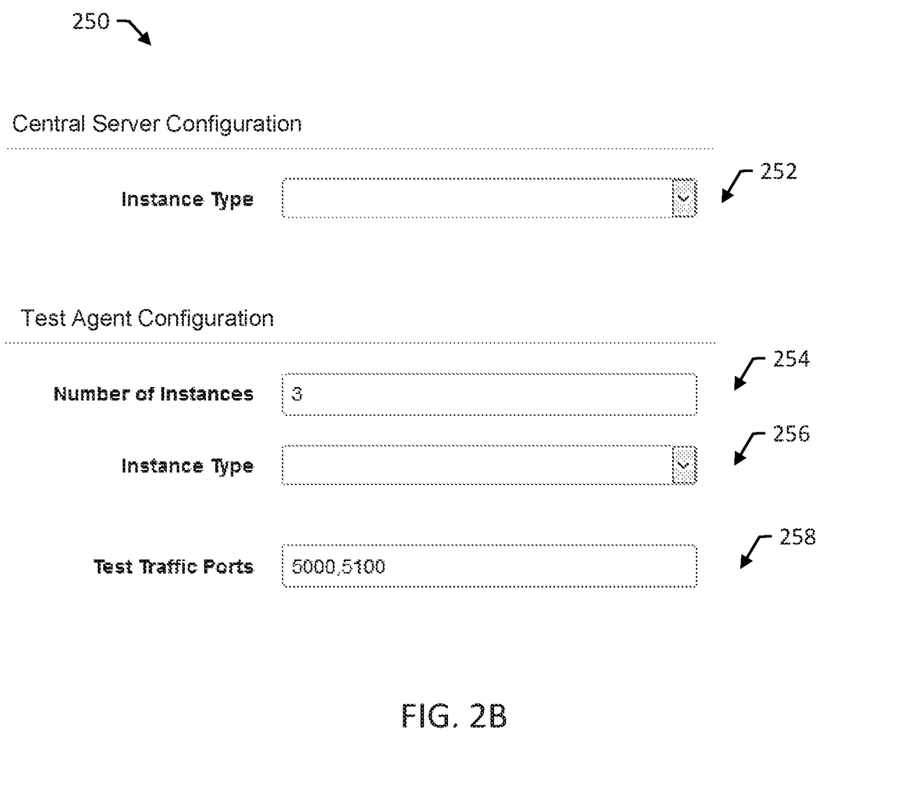
FIG. 2B shows an example screen of a GUI for deploying a networking test tool in a cloud computing system.

FIG. 2B shows an example screen 250 of GUI 208. Screen 250 includes a prompts for user input by text boxes and menus. Screen 250 includes a first prompt 252 for an instance type of a central test server to be deployed. The instance type can determine, e.g., what hardware resources will be available to the central test server.

Screen 250 includes a second prompt 254 for a number of test agents to deploy and a third prompt 256 for an instance type of the test agents. The instance type can determine, e.g., what hardware resources will be available to the test agents. Screen 250 includes a fourth prompt 258 for a user to enter a range of networking test ports to use to exchange test traffic. As shown in FIG. 2B, the user enters a simple range of ports for both TCP and UDP; however, in other examples, the GUI may be configured to allow the user to enter multiple ranges and separate ranges for TCP and UDP.

Figure 3:
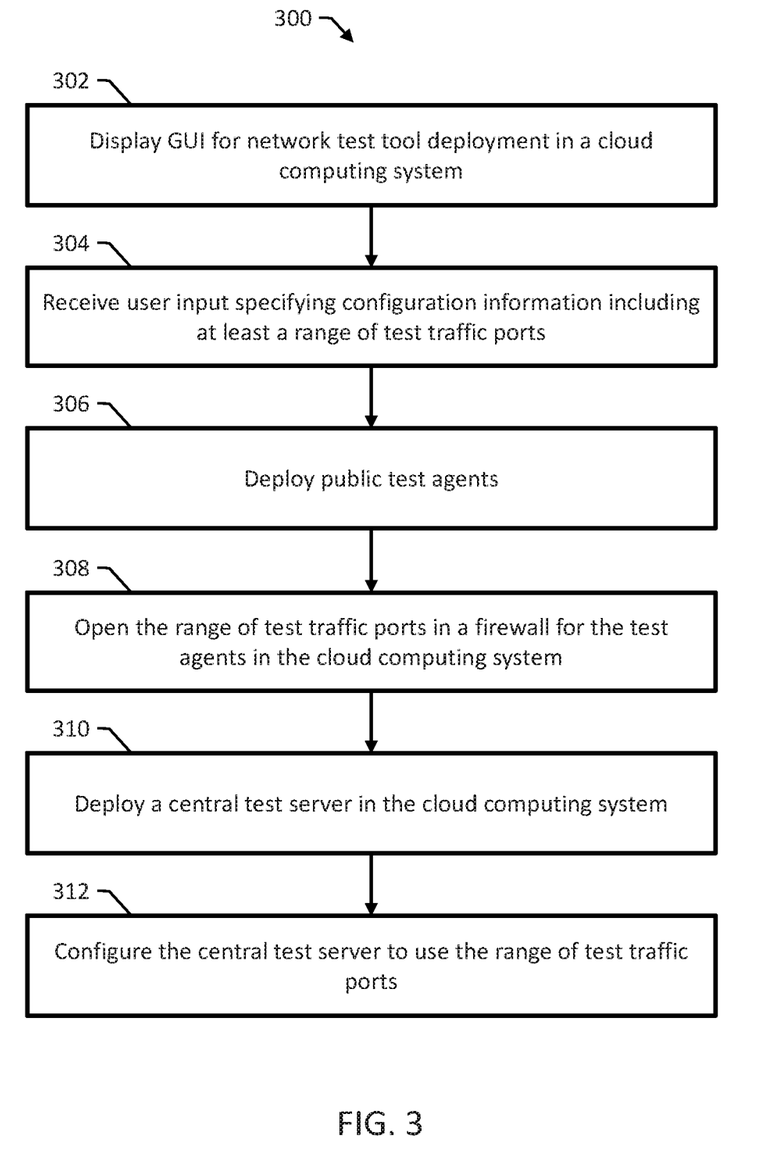
FIG. 3 is a flow diagram of an example method for deploying a networking test tool.

FIG. 3 is a flow diagram of an example method 300 for deploying a networking test tool. Method 300 can be performed, for example, by the network test deployer 206 of FIG. 2.

Method 300 includes displaying a GUI for networking test tool deployment in a cloud computing system (302). For example, the GUI can be implemented as a series of web pages with instructions and prompts for a test administrator. The test administrator view the GUI on a web browser or other appropriate application executing on a user computer device.

Method 300 includes receiving user input specifying configuration information for a networking test tool for deployment in a cloud computing system (304). The user input specifies at least a range of networking test ports and can specify other appropriate information for the deployment. For example, receiving user input specifying configuration information can include receiving resource information specifying one or more cloud computing resources of the cloud computing system for the networking test tool and receiving agent information specifying a total number of test agents for the networking test tool.

Method 300 includes deploying test agents for the networking test tool (306). Deploying the test agents includes deploying one or more public test agents in the cloud computing system. A network administrator or other entity can deploy one or more private test agents in a network outside the cloud computing system. Deploying the test agents includes configuring the test agents to exchange test traffic using the range of networking test ports specified by the user input.

Method 300 includes configuring a firewall in the cloud computing system to open the range of networking test ports in the firewall for test traffic (308). For example, configuring the firewall can include sending commands to the firewall using an API for the firewall, writing the range of networking test ports to a designated configuration file for the firewall, or sending a request to a system controller for the cloud computing system for the system controller to configure the firewall.

Method 300 includes deploying a central test server in the cloud computing system (310). Deploying the central test server includes configuring the central test server to use the range of networking test ports specified by the user input for exchanging test traffic (312).

In some examples, deploying the central test server includes configuring the central test server to automatically communicate the range of networking test ports to at least a first private test agent in the network outside the cloud computing system, resulting in the first private test agent using a first port in the range of networking test ports as a destination port for sending test traffic to a first public test agent in the cloud computing system.

Figure 4:
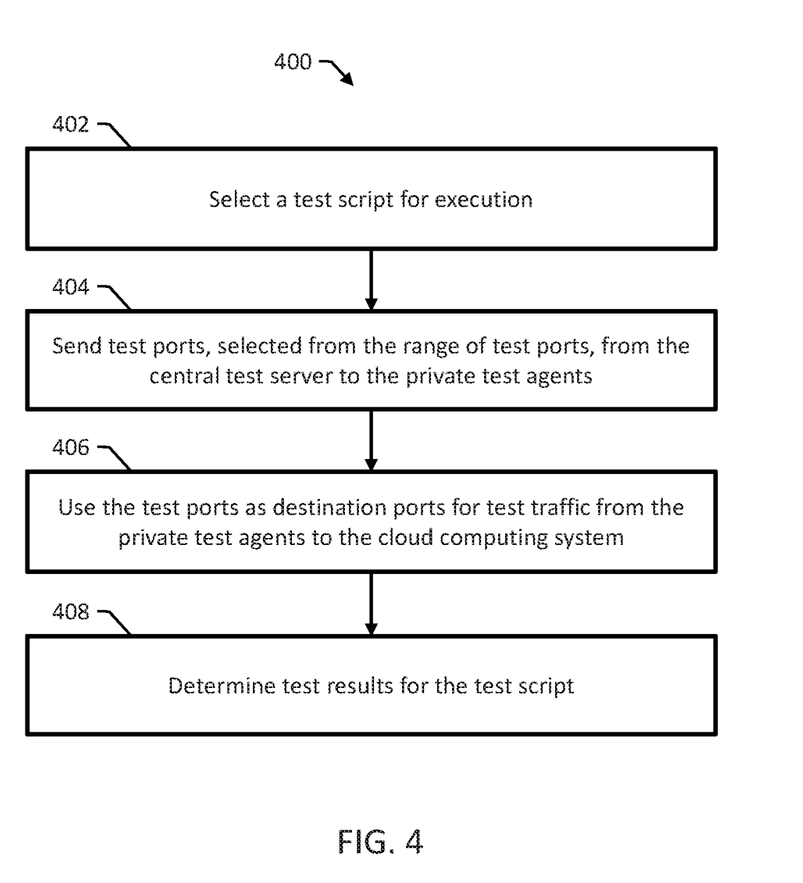
FIG. 4 is a flow chart of an example method for running a network test using a deployed networking test tool on a cloud computing system.

FIG. 4 is a flow chart of an example method 400 for running a network test using a deployed networking test tool on a cloud computing system. Method 400 can be performed, for example, by the central test server 112 of FIG. 1 working with the public and private test agents 114 and 116 of FIG. 1.

Method 400 includes selecting a test script for execution (402). For example, selecting a test script can include receiving a selected test script from a test administrator or selecting a test script scheduled to be executed.

Method 400 includes sending test ports, selected from a range of test ports configured during deployment, from the central test server to the private test agents (404). Method 400 includes using the test ports as destination ports for test traffic from the private agents to the cloud computing system (406).

For example, the private test agents can use the test ports as destination ports for the public test agents or for the central test server. Method 400 includes determining test results for the test script (408). For example, determining test results can include validating a measured value of a network performance indicator against a specified target network performance and creating and transmitting or displaying a network test report.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for deploying a networking test tool in a cloud computing system, the method comprising:

receiving, by a network test deployer implemented using at least one processor, user input specifying configuration information for a networking test tool for deployment in a cloud computing system, wherein the user input specifies a range of networking test ports, and wherein the range of networking test ports comprises a range of transmission control protocol (TCP) ports or user datagram protocol (UDP) ports or both, and wherein receiving the user input comprises displaying, on a display device, a deployment configuration graphical user interface (GUI) prompting a user for the range of networking test ports during a deployment phase of the networking test tool and before the networking test tool is deployed;

deploying, by the network test deployer, a central test server for a networking test tool in the cloud computing system and a plurality of test agents for the networking test tool, including deploying one or more public test agents in the cloud computing system, and including configuring the central test server, the one or more public test agents, and one or more private test agents in a network outside the cloud computing system to exchange test traffic using the range of networking test ports specified by the user input; and configuring, by the network test deployer and after prompting the user for the range of network test ports during the deployment phase of the networking test tool and after receiving the user input that specifies the range of networking test ports, a firewall for the cloud computing system to open the range of networking test ports specified by the user input in the firewall for the test traffic;

wherein deploying the plurality of test agents comprises configuring, after prompting the user for the range of network test ports during the deployment phase of the networking test tool and after receiving the user input that specifies the range of networking test ports, the central test server to automatically communicate the range of networking test ports to at least a first private test agent in the network outside the cloud computing system, resulting in the first private test agent using a first port in the range of networking test ports as a destination port for sending test traffic through the firewall for the cloud computing system to a first public test agent in the cloud computing system.

2. The method of claim 1, wherein the firewall is configured by default to protect the one or more public test agents by blocking all traffic into the cloud computing system.

3. The method of claim 1, comprising configuring the central test server for managing a plurality of networking tests between the one or more private test agents and the one or more public test agents.

4. The method of claim 1, comprising configuring the central test server to validate a network performance of the networking test tool when accessing the cloud computing system from the network outside of the cloud computing system.

5. The method of claim 1, wherein receiving user input specifying configuration information comprises receiving resource information specifying one or more cloud computing resources of the cloud computing system for the networking test tool and receiving agent information specifying a total number of test agents for the networking test tool.

6. The method of claim 1, wherein deploying the central test server and the plurality of test agents comprises sending commands to the cloud computing system using an application programming interface (API) of the cloud computing system.

7. A system comprising:
at least one processor; and
a network test deployer implemented using the at least one processor and programmed for:
receiving user input specifying configuration information for a networking test tool for deployment in a cloud computing system, wherein the user input specifies a range of networking test ports, and wherein the range of networking test ports comprises a range of transmission control protocol (TCP) ports or user datagram protocol (UDP) ports or both, and wherein receiving the user input comprises displaying, on a display device, a deployment configuration graphical user interface (GUI) prompting a user for the range of networking test ports during a deployment phase of the networking test tool and before the networking test tool is deployed;

deploying a central test server for a networking test tool in the cloud computing system and a plurality of test agents for the networking test tool, including deploying one or more public test agents in the cloud computing system, and including configuring the central test server, the one or more public test agents, and one or more private test agents in a network outside the cloud computing system to exchange test traffic using the range of networking test ports specified by the user input; and configuring, after prompting the user for the range of network test ports during the deployment phase of the networking test tool and after receiving the user input that specifies the range of networking test ports, a firewall for the cloud computing system to open the range of networking test ports in the firewall for the test traffic;

wherein deploying the plurality of test agents comprises configuring, after prompting the user for the range of network test ports during the deployment phase of the networking test tool and after receiving the user input that specifies the range of networking test ports, the central test server to automatically communicate the range of networking test ports to at least a first private test agent in the network outside the cloud computing system, resulting in the first private test agent using a first port in the range of networking test ports as a destination port for sending test traffic through the firewall for the cloud computing system to a first public test agent in the cloud computing system.

8. The system of claim 7, wherein the firewall is configured by default to protect the one or more public test agents by blocking all traffic into the cloud computing system.

9. The system of claim 7, wherein the network test deployer is programmed for configuring the central test server for managing a plurality of networking tests between the one or more private test agents and the one or more public test agents.

10. The system of claim 7, wherein the network test deployer is programmed for configuring the central test server to validate a network performance of the networking test tool when accessing the cloud computing system from the network outside of the cloud computing system.

11. The system of claim 7, wherein receiving user input specifying configuration information comprises receiving resource information specifying one or more cloud computing resources of the cloud computing system for the networking test tool and receiving agent information specifying a total number of test agents for the networking test tool.

12. The system of claim 7, wherein deploying the central test server and the plurality of test agents comprises sending commands to the cloud computing system using an application programming interface (API) of the cloud computing system.

13. A non-transitory computer readable medium storing executable instructions that when executed by at least one processor of a computer control the computer to perform operations comprising:
receiving user input specifying configuration information for a networking test tool for deployment in a cloud computing system, wherein the user input specifies a range of networking test ports, and wherein the range of networking test ports comprises a range of transmission control protocol (TCP) ports or user datagram protocol (UDP) ports or both, and wherein receiving the user input comprises displaying, on a display device, a deployment configuration graphical user interface (GUI) prompting a user for the range of networking test ports during a deployment phase of the networking test tool and before the networking test tool is deployed;

deploying a central test server for a networking test tool in the cloud computing system and a plurality of test agents for the networking test tool, including deploying one or more public test agents in the cloud computing system, and including configuring the central test server, the one or more public test agents, and one or more private test agents in a network outside the cloud computing system to exchange test traffic using the range of networking test ports specified by the user input; and configuring, and after prompting the user for the range of network test ports during the deployment phase of the networking test tool and after receiving the user input that specifies the range of networking test ports, a firewall for the cloud computing system to open the range of networking test ports in the firewall for the test traffic;

wherein deploying the plurality of test agents comprises configuring, after prompting the user for the range of network test ports during the deployment phase of the networking test tool and after receiving the user input that specifies the range of networking test ports, the central test server to automatically communicate the range of networking test ports to at least a first private test agent in the network outside the cloud computing system, resulting in the first private test agent using a first port in the range of networking test ports as a destination port for sending test traffic through the firewall for the cloud computing system to a first public test agent in the cloud computing system.

14. The non-transitory computer readable medium of claim 13, wherein the firewall is configured by default to protect the one or more public test agents by blocking all traffic into the cloud computing system.

15. The non-transitory computer readable medium of claim 13, the operations comprising configuring the central test server for managing a plurality of networking tests between the one or more private test agents and the one or more public test agents.

16. The non-transitory computer readable medium of claim 13, the operations comprising configuring the central test server to validate a network performance of the networking test tool when accessing the cloud computing system from the network outside of the cloud computing system.

17. The non-transitory computer readable medium of claim 13, wherein receiving user input specifying configuration information comprises receiving resource information specifying one or more cloud computing resources of the cloud computing system for the networking test tool and receiving agent information specifying a total number of test agents for the networking test tool, and wherein deploying the central test server and the plurality of test agents comprises sending commands to the cloud computing system using an application programming interface (API) of the cloud computing system.

* * * * *